United States Patent
Xie et al.

(10) Patent No.: US 8,550,708 B2
(45) Date of Patent: Oct. 8, 2013

(54) THERMAL RESISTOR TEST APPARATUS

(75) Inventors: Ling-Yu Xie, Shenzhen (CN); Xing-Ping Xie, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 227 days.

(21) Appl. No.: 13/172,171

(22) Filed: Jun. 29, 2011

(65) Prior Publication Data
US 2012/0163414 A1  Jun. 28, 2012

(30) Foreign Application Priority Data
Dec. 28, 2010 (CN) .......................... 2010 1 0609291

(51) Int. Cl.
G01K 7/00 (2006.01)
G01K 3/00 (2006.01)

(52) U.S. Cl.
USPC ............................. 374/185; 374/163; 374/101

(58) Field of Classification Search
USPC ......................... 374/185, 163, 101
See application file for complete search history.

(56) References Cited

U.S. PATENT DOCUMENTS

2001/0004236 A1 * 6/2001 Letkomiller et al. ...... 340/572.1
2006/0104330 A1 * 5/2006 Ho Limb et al. .................. 374/1

* cited by examiner

*Primary Examiner* — Mirellys Jagan
(74) *Attorney, Agent, or Firm* — Altis & Wispro Law Group, Inc.

(57) ABSTRACT

A test apparatus for a thermal resistor includes a control device, a temperature processing circuit, a voltage regulating circuit and a temperature detecting circuit. The control device stores a plurality of predetermined voltage values and outputs control signals according to those predetermined values. The temperature processing circuit receives the control signals and outputs a pulse width modulation (PWM) signal according to the control signal. The voltage regulating circuit receives the PWM signal and outputs a first direct current (DC) voltage to heat the thermal resistor. The temperature detecting circuit detects temperature signals and current signals from the thermal resistor. The control device receives the temperature signals and current signals of the thermal resistor and generates a resistance-temperature graph of the thermal resistor.

15 Claims, 2 Drawing Sheets

THERMAL RESISTOR TEST APPARATUS

BACKGROUND

1. Technical Field

The disclosure generally relates to a test apparatus, and especially to a thermal resistor test apparatus for testing the resistance-to-temperature relationship of thermal resistors.

2. Description of Related Art

A thermal resistor is a type of resistor whose resistance varies significantly with temperature, more so than in standard resistors. Thermal resistors are widely used as inrush current limiters, temperature sensors, self-resetting over-current protectors, and self-regulating heating elements. Before using the thermal resistors in circuits, the relationship between the resistance and temperature of a thermal resistor should be tested, and existing test methods are not sufficiently precise.

Therefore there is a room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
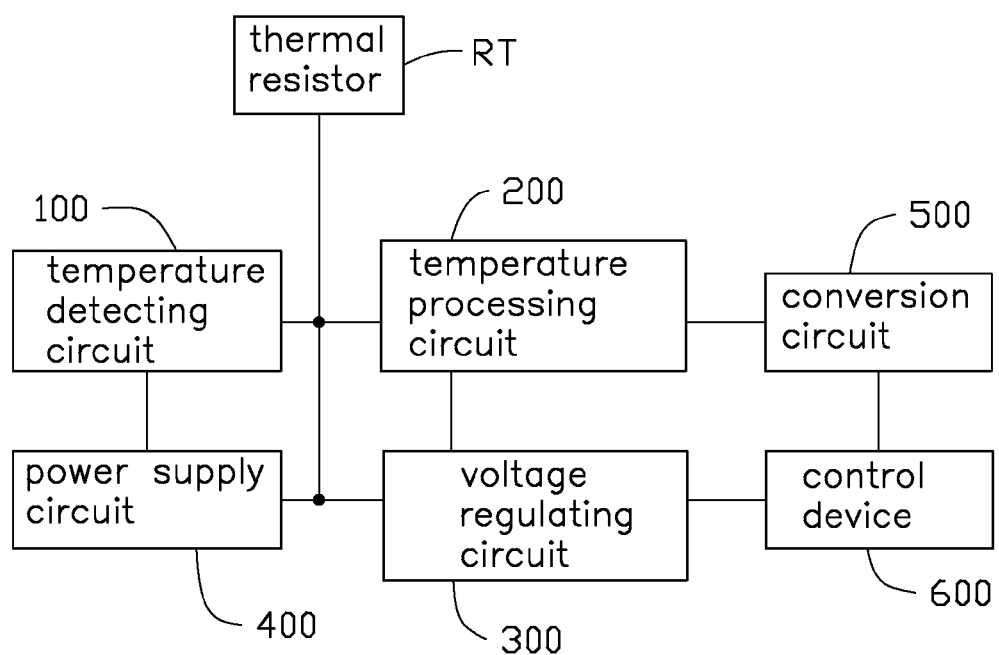
FIG. 1 is a block view of an embodiment of a thermal resistor test apparatus.

Referring to FIG. 1, an embodiment of an apparatus to measure and test the resistance-temperature relationship of a thermal resistor RT includes a temperature detecting circuit 100, a temperature processing circuit 200, a voltage regulating circuit 300, a power supply circuit 400, a conversion circuit 500 and a control device 600. The control device 600 stores a plurality of predetermined voltage values and may output control signals via the conversion circuit 500 according to the plurality of predetermined voltage values. The temperature processing circuit 200 receives the control signal and outputs a pulse width modulation (PWM) signal according to the control signal. The voltage regulating circuit 300 receives the PWM signal and outputs a first direct current (DC) voltage to heat the thermal resistor RT. The temperature detecting circuit 100 detects signals concerning temperature and current from the thermal resistor RT. The temperature detecting circuit 100 transmits these temperature and current signals to the control device 600 via the temperature processing circuit 200 and the conversion circuit 500. The control device 600 generates a resistance-temperature graph of the thermal resistor RT according to the temperature and current signals. The power supply circuit 400 provides working voltages to the temperature detecting circuit 100, the temperature processing circuit 200 and the voltage regulating circuit 300.

Figure 2:
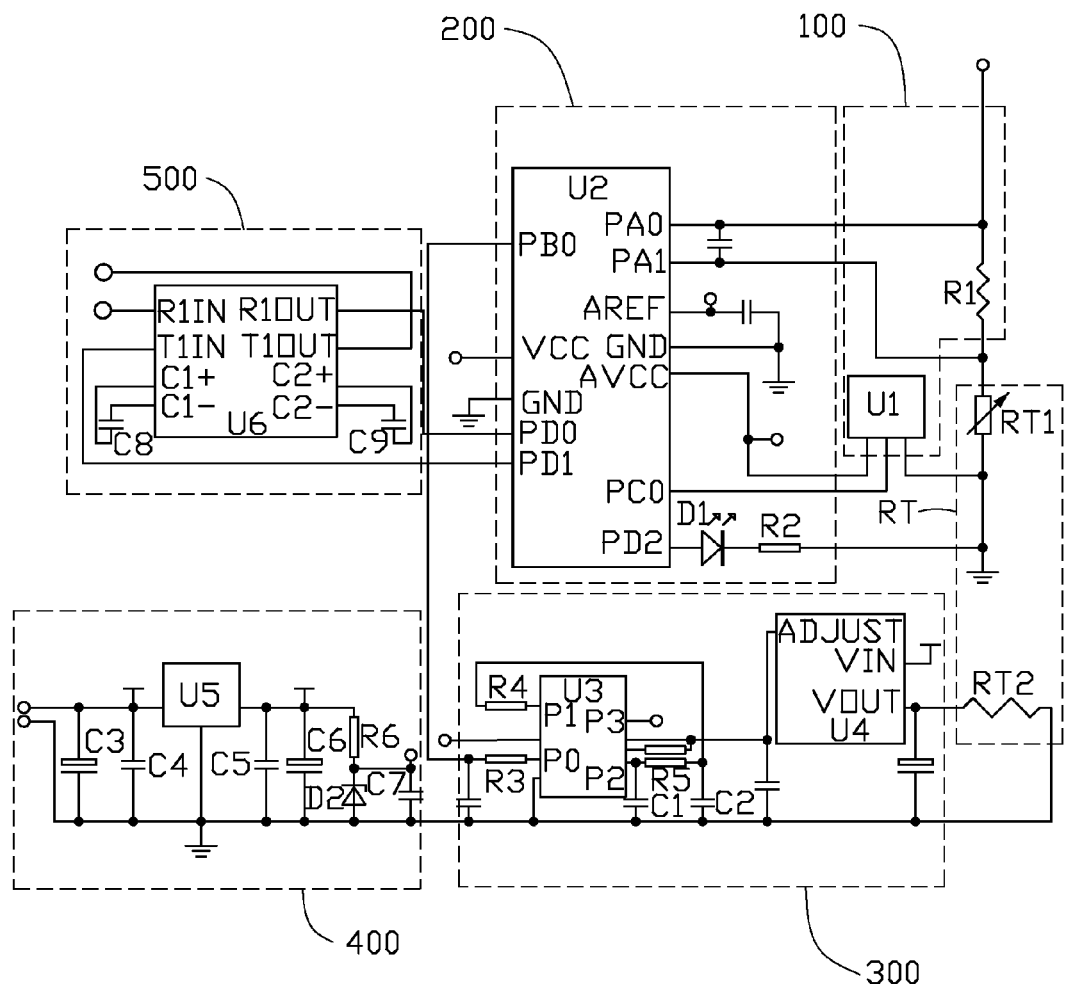
FIG. 2 is a circuit view of an embodiment of the thermal resistor test apparatus of FIG. 1.

Referring to FIG. 2, the temperature detecting circuit 100 includes a temperature sensor U1 and a first resistor R1. The temperature sensor U1 includes a temperature signal output terminal, a power terminal and a ground terminal. The first resistor R1 includes a first resistor first terminal and a first resistor second terminal. The thermal resistor RT includes a variable resistor unit RT1 and a heating unit RT2. The first resistor first terminal receives a +9 volts second DC voltage. The first resistor second terminal is grounded via the variable resistor unit RT1. The power terminal receives a +5 volts third DC voltage. The temperature sensor is grounded.

The temperature processing circuit 200 includes a microcontroller U2. The microcontroller U2 includes a first voltage signal collecting terminal PA0, a second voltage signal collecting terminal PA1, a temperature signal collecting terminal PC0, a first pulse signal output terminal PB0, a control signal receiving terminal PD0, a feedback signal receiving terminal PD1 and an indication signal output terminal PD2. The first voltage signal collecting terminal PA0 is electrically connected to the first resistor first terminal. The second voltage signal collecting terminal PA1 is electrically connected to the first resistor second terminal. The temperature signal output terminal is electrically connected to the temperature signal collecting terminal PC0. The first pulse signal output terminal PB0 outputs the PWM signals. The control signal receiving terminal PD0 receives the control signals. The feedback signal receiving terminal PD1 receives temperature and voltage signals from the variable resistor unit RT1. The indication signal output terminal PD2 is grounded via an LED (light emitting diode) D1 and a second resistor R2.

The voltage regulating circuit 300 includes an integrated operational amplifier U3 and a first voltage regulator U4. The integrated operational amplifier U3 includes a pulse signal input terminal P0, a second pulse signal output terminal P1, a DC voltage input terminal P2 and a DC voltage output terminal P3. The first voltage regulator U4 includes a control terminal Adjust, a voltage input terminal Vin and a voltage output terminal Vout. The pulse signal input terminal P0 is electrically connected to the first pulse signal output terminal PB0 via a third resistor R3. The second pulse signal output terminal P1 is electrically connected to the DC voltage input terminal P2 via a fourth resistor R4 and a fifth resistor R5 that are electrically connected in series. The fifth resistor R5 includes a fifth resistor first terminal and a fifth resistor second terminal. The fifth resistor first terminal is grounded via a first capacitor C1. The fifth resistor second terminal is grounded via a second capacitor C2. The DC voltage output terminal P3 is electrically connected to the control terminal Adjust. The voltage input terminal Vin receives the +9 volts second DC voltage. The voltage output terminal Vout is connected to the heating unit RT2 to output the first DC voltage to heat the variable resistor unit RT1.

The power supply circuit 400 includes a second voltage regulator U5 and a zener diode D2. The second voltage regulator U5 includes a second voltage regulator input terminal, a second voltage regulator ground terminal and a second voltage regulator output terminal. The zener diode D2 includes a zener diode anode and a zener diode cathode. The second voltage regulator input terminal is electrically connected to the second voltage regulator ground terminal via a third capacitor C3 and a fourth capacitor C4. The second voltage regulator output terminal is electrically connected to the second voltage regulator ground terminal via a fifth capacitor C5 and a sixth capacitor C6. The second voltage regulator input terminal is electrically connected to a voltage adapter (not shown). The second voltage regulator output terminal outputs the +5 volts third DC voltage. The second voltage regulator output terminal is electrically connected to the zener diode cathode via a sixth resistor R6. The zener diode anode is electrically connected to the second voltage regulator ground terminal. A seventh capacitor C7 is connected in parallel with the zener diode D2. A connection point between the zener diode D2, the sixth resistor R6 and the seventh capacitor C7 outputs a +1 volt fourth DC voltage. In one embodiment, the voltage adapter converts a 220 volts AC voltage to the +9 volts second DC voltage. The +5 volts third DC voltage and the +1 volt fourth DC voltage are provided to the integrated operational amplifier U3. The +9 volts second DC voltage is provided to the first voltage regulator U4 and the first resistor R1.

The conversion circuit 500 includes a voltage level conversion chip U6. In one embodiment, the voltage level conversion chip U6 is a MAX232-type chip for the RS-232 standard interface. The voltage level conversion chip U6 includes charge terminals C1+, C1−, C2+, C2− and data transforming terminals T1 IN, T1 OUT, R1 IN, R1 OUT. The charge terminal C1+ is electrically connected to the charge terminal C1− via an eighth capacitor C8. The charge terminal C2+ is electrically connected to the charge port C2− via a ninth capacitor C9. The charge terminals C1+, C1−, C2+, C2−, the eighth capacitor C8 and the ninth capacitor C9 form a charge pump circuit for generating a +12V voltage and a −12V voltage which are provided to the RS-232 standard interface. The data transforming port R1 IN acts as a first voltage level signal receiving terminal for receiving the control signals from the control device 600. The data transforming port R1 OUT acts as a first voltage level signal transmitting terminal for transmitting the control signals converted by the voltage level conversion chip U6 to the control signal receiving terminal PD0. The data transforming port T1 IN acts as a second voltage level signal receiving terminal for receiving the temperature and voltage signals from the feedback signal receiving terminal PD1. The data transforming port T1 OUT acts as a second voltage level signal transmitting terminal for transmitting the temperature and voltage signals converted by the voltage level conversion chip U6 to the control device 600.

During testing, the thermal resistor RT is electrically connected to the test apparatus as shown in FIGS. 1 and 2. The control device 600 outputs control signals to the microcontroller U2 by reference to the plurality of predetermined voltages. The microcontroller U2 outputs a PWM signal corresponding to the duty cycle output at the first pulse signal output terminal PB0. The PWM signal is transmitted to the pulse signal input terminal P0 via the third resistor R3. The PWM signal is filtered by the third resistor R3 and outputted at the second pulse signal output terminal P1. The PWM signal is filtered by the integrated operational amplifier U3 and converted to a linear DC voltage signal by the fourth resistor R4, the fifth resistor R5, the first capacitor C1 and the second capacitor C2. The linear DC voltage signal is transmitted to the DC voltage input terminal P2. The linear DC voltage signal is amplified by the integrated operational amplifier U3 and outputted at the DC voltage output terminal P3. The first voltage regulator U4 receives the linear DC voltage signal, amplified by the integrated operational amplifier U3, at the control terminal Adjust. The first voltage regulator U4 outputs the first DC voltage at the voltage output terminal Vout, as a proportion of the linear DC voltage signal, which has been amplified by the integrated operational amplifier U3. The first DC voltage heats the variable resistor unit RT1 via the heating unit RT2.

The temperature sensor U1 detects a temperature signal from the variable resistor unit RT1 and transmits the temperature signal to the temperature signal collecting terminal PC0 via the temperature signal output terminal. The first voltage signal collecting terminal PA0 collects the potential difference (first electric potential) at the first resistor first terminal. The second voltage signal collecting terminal PA1 collects the potential difference (second electric potential) at the first resistor second terminal. The first electric potential minus the second electric potential is a voltage of the first resistor R1. The microcontroller U2 calculates the voltage of the variable resistor unit RT1 by using the +9 volts second DC voltage minus the voltage of the first resistor R1. The microcontroller U2 transmits the temperature signal and the voltage signal of the variable resistor unit RT1 to the control device 600 via the voltage level conversion chip U6. The control device 600 calculates the current of the first resistor R1 by using the voltage of the first resistor R1 divided by the resistance of the first resistor R1. The current of the variable resistor unit RT1 is equal to the current of the first resistor R1. The control device 600 calculates the resistance of the variable resistor unit RT1 by using the voltage of the variable resistor unit RT1 divided by the current of the variable resistor unit RT1. The control device 600 controls the first voltage regulator U4 to output over time a plurality of first DC voltages of different values. Therefore, a plurality of resistance values of the variable resistor unit RT1 under different temperatures is calculated by the control device 600. The control device 600 generates a resistance-temperature graph of the thermal resistor RT according to the resistance values at different temperatures. During testing, the microcontroller U2 outputs an indication signal at the indication signal output terminal and controls the LED D1 emit light to indicate that a test is in progress. In one embodiment, during the initialization process before the test, the LED D1 does not emit light; during the test, the LED D1 flashes on and off, and when the test complete, the LED D1 emits steady light.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A thermal resistor test apparatus for a thermal resistor comprising:
  a control device adapted to store a plurality of predetermined voltage values and output control signals according to the plurality of predetermined voltage values;
  a temperature processing circuit adapted to receive the control signals and output a pulse width modulation (PWM) signal according to the control signal;
  a voltage regulating circuit adapted to receive the PWM signal and output a first direct current (DC) voltage to heat the thermal resistor;
  a temperature detecting circuit adapted to detect temperature signals and current signals of the thermal resistor;
  a conversion circuit adapted to convert a voltage level of the temperature signals and current signals which is identified by the control device; wherein the control device is adapted to receive the temperature signals and current signals which have been converted from the temperature detecting circuit via the temperature processing circuit and the conversion circuit, and generate a resistance-temperature graph of the thermal resistor according to the temperature signals and the current signals; and a power supply circuit adapted to provide working voltages to the temperature detecting circuit, the temperature processing circuit and the voltage regulating circuit.

2. The thermal resistor test apparatus of claim 1, wherein the power supply circuit comprises a second voltage regulator and a zener diode; the second voltage regulator comprises a second voltage regulator input terminal, a second voltage regulator ground terminal and a second voltage regulator output terminal; the zener diode comprises a zener diode anode and a zener diode cathode; the second voltage regulator input terminal is electrically connected to a voltage adapter; the second voltage regulator output terminal is adapted to output a third DC voltage; the second voltage regulator output terminal is electrically connected to the zener diode cathode via a sixth resistor; the zener diode anode is electrically connected to the second voltage regulator ground terminal; and a connection point between the zener diode and the sixth resistor is adapted to output a fourth DC voltage.

3. The thermal resistor test apparatus of claim 1, wherein the conversion circuit comprises a voltage level conversion chip having a first voltage level signal receiving terminal, a first voltage level signal transmitting terminal, a second voltage level signal receiving terminal and a second voltage level signal transmitting terminal; the first voltage level signal receiving terminal is adapted to receive the control signals from the control device; the first voltage level signal transmitting terminal is adapted to transmit the control signal converted by the voltage level conversion chip to the control signal receiving terminal; the second voltage level signal receiving terminal is adapted to receive the temperature signals and voltage signals from the feedback signal receiving terminal; and the second voltage level signal transmitting terminal is adapted to transmit the temperature signals and voltage signals converted by the voltage level conversion chip to the control device.

4. The thermal resistor test apparatus of claim 1, wherein the temperature detecting circuit comprises a temperature sensor and a first resistor; the temperature sensor comprises a temperature signal output terminal; the first resistor comprises a first resistor first terminal and a first resistor second terminal; the thermal resistor comprises a variable resistor unit and a heating unit; the first DC voltage is adapted to heat the variable resistor unit via the heating unit; the first resistor first terminal is adapted to receive a second DC voltage; the first resistor second terminal is grounded via the variable resistor unit; and the temperature sensor is adapted to detect temperature signals of the variable resistor unit and transmit the temperature signals to the temperature processing circuit via the temperature signal output terminal.

5. The thermal resistor test apparatus of claim 4, wherein the temperature processing circuit comprises a microcontroller; the microcontroller comprises a first voltage signal collecting terminal, a second voltage signal collecting terminal and a temperature signal collecting terminal; the first voltage signal collecting terminal is electrically connected to the first resistor first terminal to collect a first electric potential; the second voltage signal collecting terminal is electrically connected to the first resistor second terminal to collect a second electric potential; and the temperature signal collecting terminal is electrically connected to the temperature signal output terminal.

6. The thermal resistor test apparatus of claim 5, wherein the microcontroller further comprises an indication signal output terminal; and the indication signal output terminal is grounded via a LED and a second resistor that are electrically connected in series.

7. The thermal resistor test apparatus of claim 5, wherein the microcontroller further comprises a first pulse signal output terminal, a control signal receiving terminal and a feedback signal receiving terminal; the first pulse signal output terminal is adapted to output the PWM signal; the control signal receiving terminal is adapted to receive the control signal; and the feedback signal receiving terminal is adapted to output the temperature signals and voltage signals of the variable resistor unit.

8. The thermal resistor test apparatus of claim 7, wherein the voltage regulating circuit comprises an integrated operational amplifier and a first voltage regulator; the integrated operational amplifier comprises a pulse signal input terminal, a second pulse signal output terminal, a DC voltage input terminal and a DC voltage output terminal; the first voltage regulator comprises a control terminal and a voltage output terminal; the pulse signal input terminal is electrically connected to the first pulse signal output terminal via a third resistor; the second pulse signal output terminal is electrically connected to the DC voltage input terminal via a fourth resistor and a fifth resistor that are electrically connected in series; the DC voltage output terminal is electrically connected to the control terminal; and the voltage output terminal is grounded via the heating unit to output the first DC voltage to heat the variable resistor unit.

9. A thermal resistor test apparatus for a thermal resistor comprising:
a control device adapted to store a plurality of predetermined voltage values and outputs control signals according to the plurality of predetermined voltage values;
a temperature processing circuit adapted to receive the control signals via a conversion circuit, and output a pulse width modulation (PWM) signal according to the control signal;
a voltage regulating circuit adapted to receive the PWM signal and output a first direct current (DC) voltage to heat the thermal resistor;
a temperature detecting circuit adapted to detect temperature signals and current signals of the thermal resistor; and
a power supply circuit adapted to provide working voltages to the temperature detecting circuit, the temperature processing circuit and the voltage regulating circuit;
wherein the conversion circuit is adapted to convert a voltage level of the temperature signals and current signals which is identified by the control device; the temperature detecting circuit is adapted to transmit the temperature signals and current signals to the control device via the temperature processing circuit and the conversion circuit; and the control device is adapted to receive the temperature signals and current signals which have been converted of the thermal resistor and generate a resistance-temperature graph of the thermal resistor according to the temperature signals and the current signals.

10. The thermal resistor test apparatus of claim 9, wherein the power supply circuit comprises a second voltage regulator and a zener diode; the second voltage regulator comprises a second voltage regulator input terminal, a second voltage regulator ground terminal and a second voltage regulator output terminal; the zener diode comprises a zener diode anode and a zener diode cathode; the second voltage regulator input terminal is electrically connected to a voltage adapter; the second voltage regulator output terminal is adapted to output a third DC voltage; the second voltage regulator output terminal is electrically connected to the zener diode cathode via a sixth resistor; the zener diode anode is electrically connected to the second voltage regulator ground terminal; and a connection point between the zener diode and the sixth resistor is adapted to output a fourth DC voltage.

11. The thermal resistor test apparatus of claim 9, wherein the temperature detecting circuit comprises a temperature sensor and a first resistor; the temperature sensor comprises a temperature signal output terminal; the first resistor comprises a first resistor first terminal and a first resistor second terminal; the thermal resistor comprises a variable resistor unit and a heating unit; the first DC voltage is adapted to heat the variable resistor unit via the heating unit; the first resistor first terminal is adapted to receive a second DC voltage; the first resistor second terminal is grounded via the variable resistor unit; and the temperature sensor is adapted to detect temperature signals of the variable resistor unit and transmit the temperature signals to the temperature processing circuit via the temperature signal output terminal.

12. The thermal resistor test apparatus of claim 11, wherein the temperature processing circuit comprises a microcontroller; the microcontroller comprises a first voltage signal collecting terminal, a second voltage signal collecting terminal and a temperature signal collecting terminal; the first voltage signal collecting terminal is electrically connected to the first resistor first terminal to collect a first electric potential; the second voltage signal collecting terminal is electrically connected to the first resistor second terminal to collect a second electric potential; and the temperature signal collecting terminal is electrically connected to the temperature signal output terminal.

13. The thermal resistor test apparatus of claim 12, wherein the microcontroller further comprises an indication signal output terminal; and the indication signal output terminal is grounded via a LED and a second resistor that are electrically connected in series.

14. The thermal resistor test apparatus of claim 12, wherein the microcontroller further comprises a first pulse signal output terminal, a control signal receiving terminal and a feedback signal receiving terminal; the first pulse signal output terminal is adapted to output the PWM signal; the control signal receiving terminal is adapted to receive the control signal; and the feedback signal receiving terminal is adapted to output temperature signals and voltage signals of the variable resistor unit.

15. The thermal resistor test apparatus of claim 14, wherein the voltage regulating circuit comprises an integrated operational amplifier and a first voltage regulator; the integrated operational amplifier comprises a pulse signal input terminal, a second pulse signal output terminal, a DC voltage input terminal and a DC voltage output terminal; the first voltage regulator comprises a control terminal and a voltage output terminal; the pulse signal input terminal is electrically connected to the first pulse signal output terminal via a third resistor; the second pulse signal output terminal is electrically connected to the DC voltage input terminal via a fourth resistor and a fifth resistor that are electrically connected in series; the DC voltage output terminal is electrically connected to the control terminal; and the voltage output terminal is grounded via the heating unit to output the first DC voltage to heat the variable resistor unit.

\* \* \* \* \*